United States Patent
Butler

(10) Patent No.: US 9,429,424 B2
(45) Date of Patent: Aug. 30, 2016

(54) ANGULAR MEASUREMENT TOOL

(71) Applicant: Edgeline Holdings, LLC, Fort Washington, PA (US)

(72) Inventor: Jonas Butler, Spring Mills, PA (US)

(73) Assignee: Edgeline Holdings, LLC, Fort Washington, PA (US)

( * ) Notice: Subject to any disclaimer, the term of this patent is extended or adjusted under 35 U.S.C. 154(b) by 119 days.

(21) Appl. No.: 14/460,556

(22) Filed: Aug. 15, 2014

(65) Prior Publication Data
US 2016/0047650 A1    Feb. 18, 2016

(51) Int. Cl.
G01C 9/34 (2006.01)
B43L 7/033 (2006.01)
B43L 7/027 (2006.01)

(52) U.S. Cl.
CPC .............. *G01C 9/34* (2013.01); *B43L 7/0275* (2013.01)

(58) Field of Classification Search
CPC ........ B43L 7/033; B43L 7/0275; G01C 9/34
USPC ................................... 33/429, 451
See application file for complete search history.

(56) References Cited

U.S. PATENT DOCUMENTS

| | | | |
|---|---|---|---|
| 666,190 A * | 1/1901 | Fontanella | G01C 9/12 33/391 |
| 885,076 A * | 4/1908 | Olson | G01C 9/12 33/342 |
| 2,640,268 A * | 6/1953 | Thompson | B25H 7/00 33/451 |
| 3,009,250 A * | 11/1961 | Schock | G01C 9/34 33/388 |
| 3,187,437 A * | 6/1965 | Ellis | B25H 7/04 33/332 |
| 4,404,753 A * | 9/1983 | Klok | B43L 7/0275 33/371 |
| 4,712,307 A * | 12/1987 | Kish | G01B 3/56 33/421 |
| 4,964,219 A * | 10/1990 | Clark | G01C 9/24 33/384 |
| 4,977,680 A * | 12/1990 | Marshall | G01C 9/34 33/347 |
| 5,170,568 A * | 12/1992 | Wright | B43L 7/0275 33/429 |
| D416,501 S | 11/1999 | DiGangi et al. | |
| 6,230,416 B1 * | 5/2001 | Trigilio | B43L 7/027 33/451 |
| 6,314,652 B1 * | 11/2001 | English | G01B 5/24 33/419 |
| 7,152,335 B2 | 12/2006 | Nichols | |
| 7,481,143 B2 | 1/2009 | Hiland | |
| 7,827,699 B2 | 11/2010 | Montgomery | |
| 9,180,725 B2 * | 11/2015 | Lin | B43L 7/033 |
| 2007/0011896 A1 | 1/2007 | Diaz et al. | |

* cited by examiner

*Primary Examiner* — Christopher Fulton
(74) *Attorney, Agent, or Firm* — Schott, P.C.

(57) ABSTRACT

A right angle square includes a right isosceles triangle shaped right angle square with three sides. The three sides comprise a pitch edge, a hypotenuse, and another side. The right angle square also has a closed and arced angular measurement tube extending along a portion of a circumferential arc between the non-hypotenuse sides and the tube contains a fluid and a bubble that moved through the fluid. The right angle square also has a measurement scale. When the pitch edge is aligned against a slope to be measured, the bubble rises to the highest point in the tube, and the bubble is aligned on the measurement scale at a point along the measurement scale corresponding to the slope being measured.

20 Claims, 3 Drawing Sheets

ANGULAR MEASUREMENT TOOL

BACKGROUND

Simple bubble levels measure whether a surface is planar or sloped, and allow a carpenter to level the surface (if so desired). A carpenter might also use a laser level to achieve the same result. A simple bubble level or even laser level, however, do not measure angles and pitches.

For angle and pitch measurement of a sloped surface, a carpenter may measure the sides of a triangle and use geometry to measure the slope, or use a right angle square, which is a right angled tool used for measuring angles. This simple tool is like a protractor and measures degrees or pitch, depending on the measurement scale desired. To measure an existing pitch using a right angle square, a user aligns the right angle square to level or vertical and measures the angles like you might do using a protractor. Such alignment to level and measurement, while not impossible, is not always convenient and takes more time than may be necessary.

SUMMARY OF THE EMBODIMENTS

A right angle square includes a right isosceles triangle shaped right angle square with three sides. The three sides comprise a pitch edge, a hypotenuse, and another side. The right angle square also has a closed and arced angular measurement tube extending along a portion of a circumferential arc between the non-hypotenuse sides and the tube contains a fluid and a bubble that moved through the fluid. The right angle square also has a measurement scale. When the pitch edge is aligned against a slope to be measured, the bubble rises to the highest point in the tube, and the bubble is aligned on the measurement scale at a point along the measurement scale corresponding to the slope being measured.

DETAILED DESCRIPTION OF THE EMBODIMENTS

Figure 1:
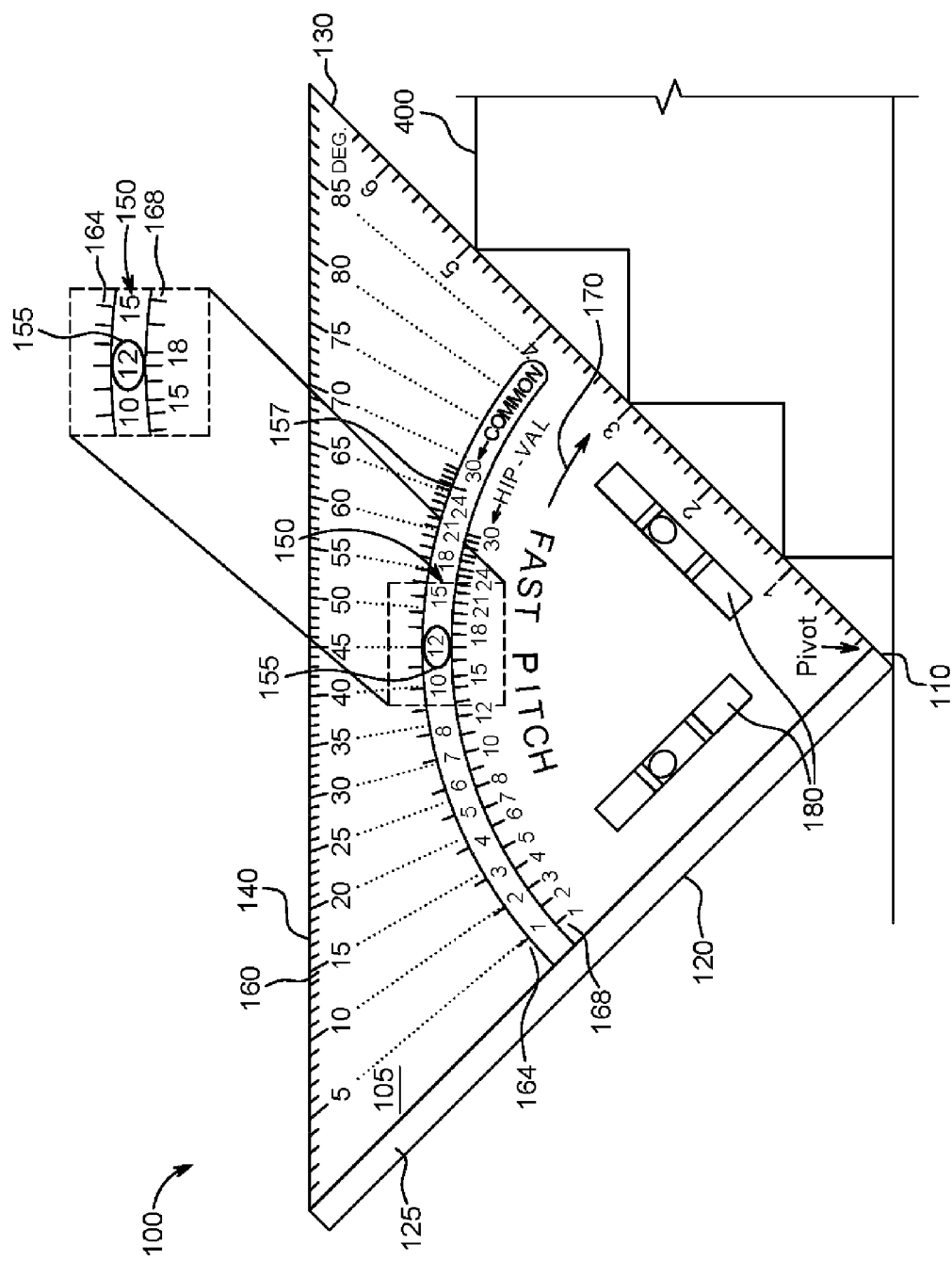
FIG. 1 shows one embodiment of a right angle square.

FIG. 1 shows one embodiment of the portable fast pitch right angle square 100 that is smaller and more usable than a torpedo level. The right angle square 100 is a right isosceles triangle with a pivot 110 and two sides 120, 130 at right angles to one another. In cross-section, the side 120 is T-shaped and thus for simplicity will be referred to herein as the T-shaped side 120 to differentiate it from the pitch side 130 and hypotenuse 140. The T-shaped side 120 comprises an edge 125 that extends from the right angle square body 105.

In practice, in order to measure a slope angle, a user places the right angle square 100 with its pitch edge 130 along the slope 400 to be measured. Noting that the slope 400 could be stacked blocks as shown or a solid pitched plane, the angle of the pitch edge changes depending on the slope 400 angle and this in turn moves a bubble 155 within the curved angular measurement tube 150. The tube 150 is a closed cylinder, generally filled with ethanol or another alcohol 157, and may be colored to aid in viewing. The bubble 155 will settle at the highest position within the tube 150, and that position is aligned with different measurement grades.

As shown, the bubble 155 has risen to its highest point in the tube 150, and that corresponds to 45 degrees as read on the degree scale 160, an approximate pitch of 12 (a rise of 12" for 12" of horizontal) on the common pitch scale 164, or 17 (a rise of 17" over 17" of horizontal) on the hip and valley scale 168. Any one of these measurements may be printed or engraved on the tube 150, so that the longer interpolation out to the degree scale 160 along the hypotenuse 140 would not be necessary.

The tube 150 is shown as a 90 degree arc of a circumference. Although a larger arc is possible, it would not be necessary for the simple pitch measurement shown. That said, if the tube arc extended past 90 degrees, the tube 150 could be used to measure for a level planar surface. Even with the tube 150 in use in a 90 degree arc, however, the fast pitch right angle square 100 may be used to find planar level easily, if it includes traditional level tubes 180, that can find a planar level when the T shaped side 120 or pitch side 130 are placed along a surface to be measured. This would allow the fast pitch right angle square 100 to measure both pitch and level, even if the tube 150 only spanned a 90 degree arc.

The fast pitch right angle square 100 may have an arrow 170 that reminds its user to place the pitch edge 130 against the slope to be measured.

Figure 2:
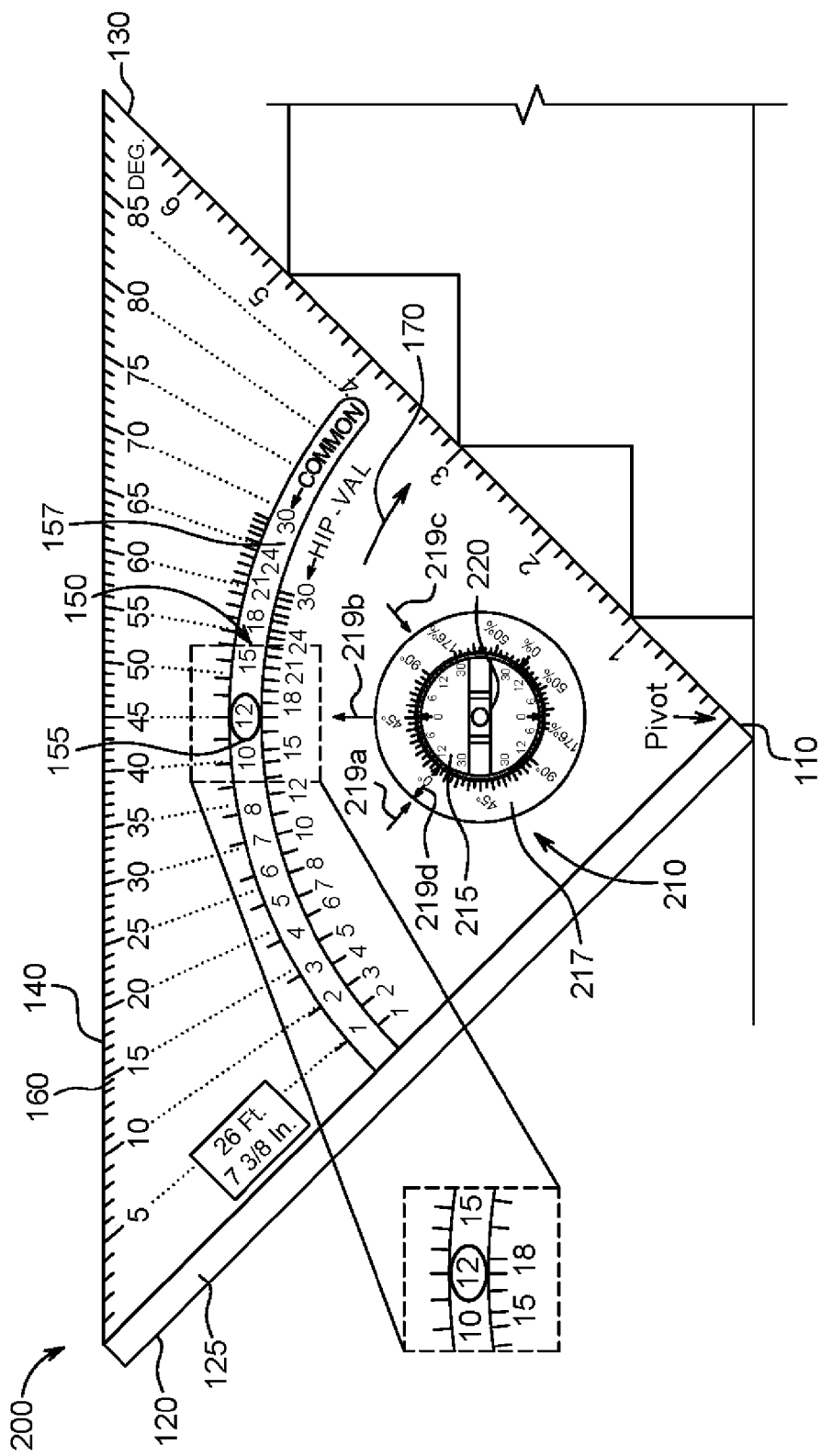
FIG. 2 shows another embodiment of a right angle square.
Figure 3:
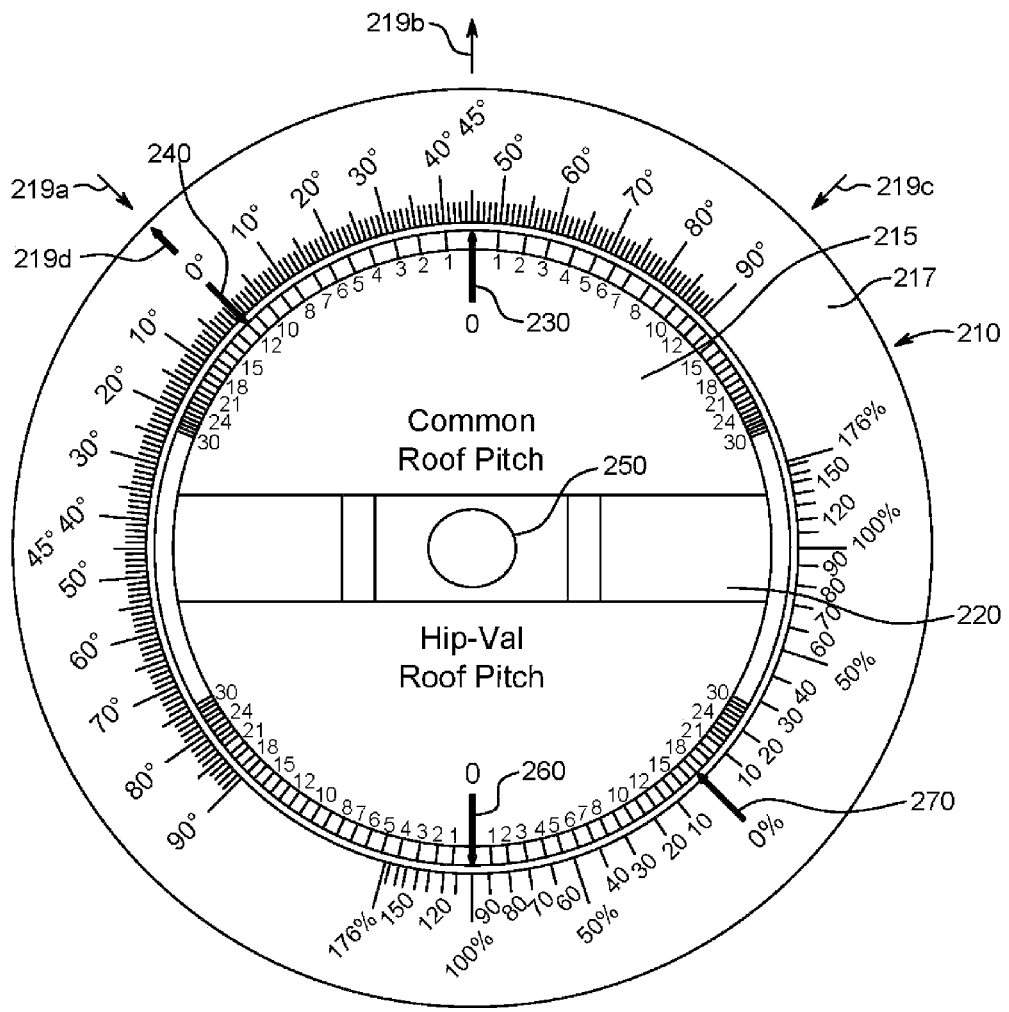
FIG. 3 shows an enlarged view of the pitch wheel shown in FIG. 2.

FIGS. 2 and 3 show alternate embodiments of the fast pitch right angle square 200 with the addition of a more accurate pitch wheel 210. (FIG. 3 shows an enlargement of the pitch wheel 210 with more details.) The pitch wheel 210 includes a rotating inner wheel portion 215 that includes within it, a traditional level tube 220 and a rotating outer face portion 217. The high degree of curvature in the arced tube 150 may create imperfections along its surface that trap the bubble 155 a few degrees from its full ascent along the tube 150. The pitch wheel 210, in contrast, ensures a greater accuracy through its use of the more finely-tuned pitch wheel tube 220.

In use to measure angle and slope using the pitch wheel 210, the first step is to choose one of the edges 120, 130, or 140 that will be placed on the slope to be measured. These three positions corresponding to each side may have lockable positions of the outer wheel 217 such that it cannot shift from those positions inadvertently. The inner wheel 215 may, in an embodiment, have a block that prevents it from rotating in a way that would allow the inner face level 220 from being upside down when measuring the pitch.

Having made that choice, a user then aligns the outer pitch wheel 217 and the outer pitch wheel edge alignment arrow 219*d* to one of the three edge alignment arrows 219*a*, 219*b*, or 219*c* that point towards the corresponding edges 130, 140, and 120 respectively.

Using the example in FIG. 2, the user has chosen pitch side 130, so the user would align the outer pitch wheel edge alignment arrow 219*d* on the outer wheel 217 to line up with alignment arrow 219*a*. When the user sets the right angle square 100 with its pitch edge 130 against the slope 400, he then adjusts the inner wheel 215 until the bubble level 220's bubble 250 is in the middle. At that point, the user can read the angle from the angle arrow 230, the common pitch from the zero or common arrow 240, the grade or % from the grade or % arrow 260, and the hip valley pitch from the hip valley arrow 270.

Thus, with one movement, a user gets multiple measurements in a simple mechanical tool.

The same measurements are possible using the other sides of the right angle square 120 and 140 if the side 120 is placed against a slope, and the hypotenuse side 140 can even be used under a slope to take measurements.

Other features may be added to the fast pitch right angle square 100, 200 to complement the aforementioned features. For example, the right angle square 100, 200 may contain a laser level that aims a beam of light down each or one of the T-shaped edge 120 and/or pitch edge 130. This would allow for detecting planar surfaces or marking, leveling, and/or range-finding across the distance that such a laser would reach. Ideally, such a laser would be mounted to shoot parallel and down the edges 120, 130.

In a "smart" version of the right angle square 100, 200, the pitch, grades, angles, distances, directions, or coordinates could be recorded electronically. Such data could be stored in the right angle square using a data entry and storage system accessible to the user, perhaps via a small touchscreen. Or the data might be transmitted from the right angle square 100, 200 to another device using a Bluetooth or other wireless or wired connection. In combination with GPS capabilities in either or both of the right angle square or other electronic device, the pitch, angle, distances, directions, or coordinates of multiple areas could be measured and recorded easily.

The right angle square 200 is shown in the figures with both the arced tube 150 and pitch wheel 210. A right angle square without an arced tube 150 but with a pitch wheel 210 (including one of a larger size for increased accuracy) is also possible.

While the invention has been described with reference to the embodiments above, a person of ordinary skill in the art would understand that various changes or modifications may be made thereto without departing from the scope of the claims.

The invention claimed is:

1. A right angle square comprising:
a right isosceles triangle shaped speed square comprising three sides, the three sides comprising a pitch edge side, a hypotenuse side, and another side;
a closed and arced angular measurement tube extending along a portion of a circumferential arc between the non-hypotenuse sides, the tube containing a fluid and a bubble that moved through the fluid;
a tube measurement scale that measures a slope; and
a pitch wheel comprising a rotatable outer wheel and a rotatable inner wheel comprising a bubble level, wherein when any edge is aligned against a slope to be measured and the tube level is set to its level point, an arrow on one of the wheels aligns with a wheel measurement scale on the other one of the wheels corresponding to the slope being measured;
wherein when the pitch edge is aligned against the slope to be measured, the bubble rises to a highest point in the tube, and the bubble is aligned on the tube measurement scale at a point along the tube measurement scale corresponding to the slope being measured.

2. The right angle square of claim 1, wherein the measurement scale is printed on the tube.

3. The right angle square of claim 1, wherein the measurement scale is in degrees.

4. The right angle square of claim 1, wherein the measurement scale is in a common pitch.

5. The right angle square of claim 1, wherein the measurement scale is in hip valley pitch.

6. The right angle square of claim 1, further comprising a tube level parallel to one of the sides.

7. The right angle square of claim 1, further comprising an indicator to show which side is the pitch edge side.

8. The right angle square of claim 1, wherein the wheel scale is in degrees, common pitch, and hip-valley pitch.

9. The right angle square of claim 1, wherein the wheels rotate about a common center point.

10. The right angle square of claim 1, wherein the arrow is located on the rotatable inner wheel and gives readings on the wheel measurement scale located on the rotatable outer wheel.

11. The right angle square of claim 10, further comprising a second arrow located on the rotatable outer wheel that gives readings on a second wheel measurement scale located on the rotatable inner wheel.

12. The right angle square of claim 1, wherein the arrow is located on the rotatable outer wheel and gives readings on the wheel measurement scale located on the rotatable inner wheel.

13. The right angle square of claim 12, further comprising a second arrow located on the rotatable inner wheel that gives readings on a second wheel measurement scale located on the rotatable outer wheel.

14. The right angle square of claim 1, further comprising a second arrow that gives readings on a second wheel measurement scale, wherein the second arrow gives a complementary angle reading to the angle reading on the first scale.

15. A right angle square comprising:
a right isosceles triangle shaped speed square comprising three sides, the three sides comprising a pitch edge side, a hypotenuse side, and another side;
a pitch wheel comprising:
a rotatable inner wheel comprising a tube level; and
a rotatable outer wheel comprising a wheel measurement scale for measuring a slope; wherein when any edge is aligned against a slope to be measured and the tube level is set to its level point, an arrow on one of the wheels aligns with a measurement on the wheel measurement scale corresponding to the slope being measured, wherein the wheels rotate about a common center point.

16. The right angle square of claim 15, wherein the arrow is located on the rotatable inner wheel and gives readings on the wheel measurement scale located on the rotatable outer wheel.

17. The right angle square of claim 16, further comprising a second arrow located on the rotatable outer wheel that gives readings on a second wheel measurement scale located on the rotatable inner wheel.

18. The right angle square of claim 12, wherein the arrow is located on the rotatable outer wheel and gives readings on the wheel measurement scale located on the rotatable inner wheel.

19. The right angle square of claim 18, further comprising a second arrow located on the rotatable inner wheel that gives readings on a second wheel measurement scale located on the rotatable outer wheel.

20. The right angle square of claim 15, further comprising a second arrow that gives readings on a second wheel measurement scale, wherein the second arrow gives a complementary angle reading to the angle reading on the first scale.

* * * * *